US006763109B1

(12) United States Patent
Hoskins

(10) Patent No.: US 6,763,109 B1
(45) Date of Patent: Jul. 13, 2004

(54) COPPER BASED INTERFACE SYSTEM AND REGULATED POWER SOURCE

(75) Inventor: Lawrence Marion Hoskins, Fort Worth, TX (US)

(73) Assignee: Advanced Fibre Access Corporation, Petaluma, CA (US)

( * ) Notice: Subject to any disclaimer, the term of this patent is extended or adjusted under 35 U.S.C. 154(b) by 608 days.

(21) Appl. No.: 09/684,756

(22) Filed: Oct. 6, 2000

(51) Int. Cl.[7] .......................... H04M 1/00; H04M 9/00
(52) U.S. Cl. ................ 379/413; 379/402; 379/395.01; 379/399.01
(58) Field of Search ................ 379/399.01, 413, 379/413.01, 413.02, 413.03, 414, 390, 402, 386, 324, 442, 444, 426, 437, 160, 187, 121.01, 322

(56) References Cited

U.S. PATENT DOCUMENTS

| 5,148,144 | A | | 9/1992 | Sutterlin et al. |
| 5,903,567 | A | | 5/1999 | Alger-Meunier |
| 5,909,445 | A | | 6/1999 | Schneider |
| 6,208,664 | B1 | * | 3/2001 | Plummer et al. ........... 370/480 |
| 6,282,204 | B1 | | 8/2001 | Balatoni et al. |
| 6,353,609 | B1 | | 3/2002 | Ethridge et al. |
| 6,385,253 | B1 | * | 5/2002 | Swisher ...................... 375/259 |
| 6,580,254 | B2 | * | 6/2003 | Schofield .................... 323/234 |
| 2001/0040899 | A1 | | 11/2001 | Carter et al. |
| 2002/0106076 | A1 | * | 8/2002 | Norrell et al. .......... 379/399.01 |

OTHER PUBLICATIONS

Pollakowski, Martin, "The Future of XDSL and ISDN: Competition, Coexistence or Integration?", Fachhochschule Gelsenkirchen, Fachbereich Elektrotechnik, Germany, Sep. 1999, pp. 1–5.

* cited by examiner

Primary Examiner—Binh Tieu
Assistant Examiner—Tuan Pham
(74) Attorney, Agent, or Firm—Jones Day

(57) ABSTRACT

Method and apparatus for providing a regulated and current limited power source to support bidirectional telephone delivery circuitry and methods for a multiplicity of telephone subscriber lines to a downstream distribution terminal using only two preexisting transmission lines for carrying the regulated and current limited power along with a multiplicity of HDSL TDM communication channels.

15 Claims, 6 Drawing Sheets

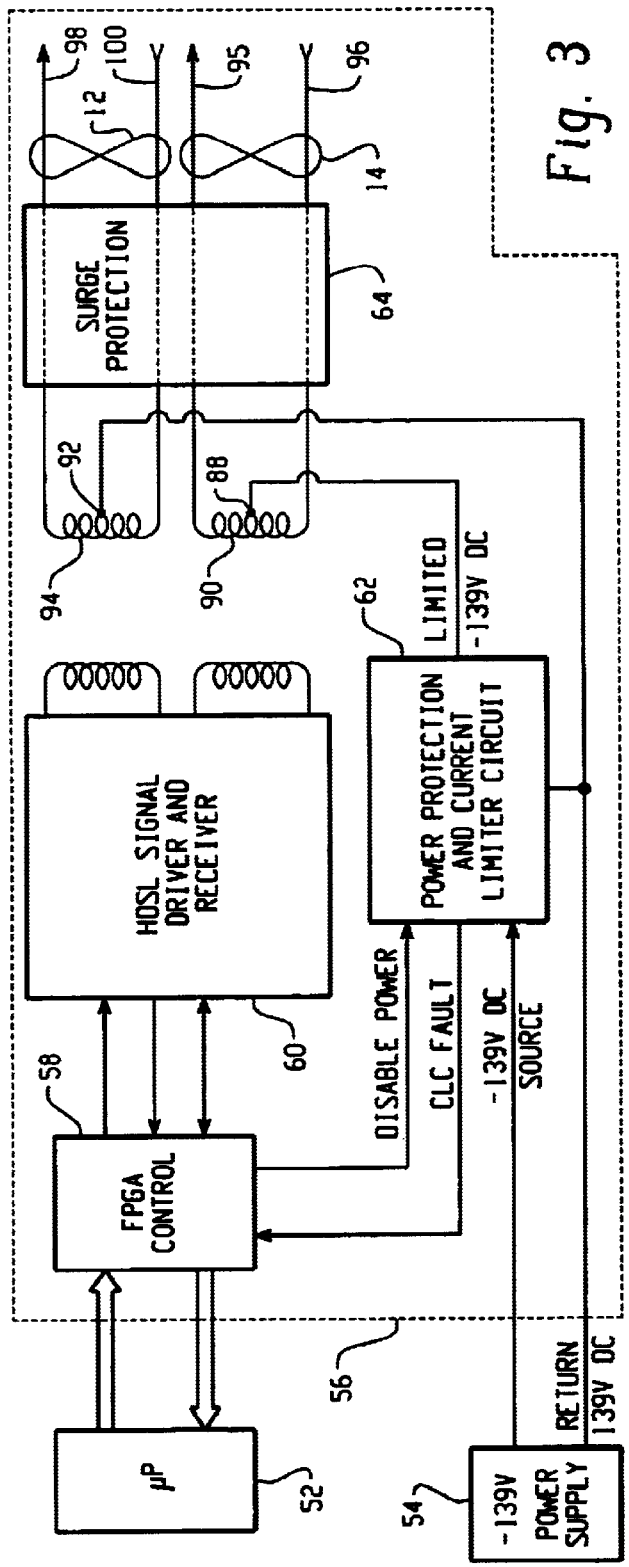
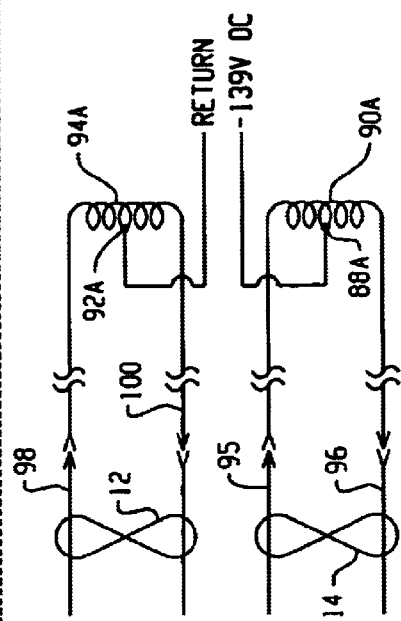
Fig. 3
Fig. 3A

US 6,763,109 B1

COPPER BASED INTERFACE SYSTEM AND REGULATED POWER SOURCE

BACKGROUND OF THE INVENTION

1. Field of the Invention

The present invention relates to telephone systems and more particularly to methods and apparatus for upgrading an existing tip and ring prior art telephone system which uses a pair of copper conductors for each bidirectional connection between two distribution terminals to a system which requires only two pairs of existing copper (or other metal) conductors for carrying a plurality (such as twenty-four) bidirectional communications between the two distribution terminals. The invention also relates to such methods and apparatus for upgrading a telephone system which, after being upgraded according to the teachings of this invention, is compatible for still further and future upgrades.

2. Description of Related Art

Over the last twenty years, the demands for "telephone"-type communications has increased at exponential rates. Telephone-type communications, or "telephony," is no longer simply applicable to telephone voice communications. In fact, the demands on the infrastructure and existing telephone systems from other types of telephony such as faxes, computer modems, etc. and other broadband uses now exceed voice communications in most locations.

Consequently, telephone systems in these high-density areas now use many different high speed, broadband transmission techniques including light transmission through optical fibers. Yet, even though there are areas of communications or physical locations demanding this very high-density type of service, there are likely to be other areas of communications or physical locations immediately adjacent where the demands on telephone service has increased only slightly from the demands of twenty years ago. Therefore, methods and equipment must be provided which interface various levels of service demands.

It is therefore not unusual to require different upgrade levels of a telephone system depending upon these highly varying needs. In addition, because new and different services which require high-speed and broadband telephone communications seem to be hitting the market everyday, it is also desirable to provide methods and apparatus for upgrading a telephone system which upgraded methods and apparatus will also allow for continuous and much expanded upgrades of service in the future with minimal change to the infrastructure.

SUMMARY OF THE INVENTION

Therefore, it is an object of the invention to provide methods and apparatus to increase the number of communication channels carried by existing copper wire pairs.

It is yet another object of the present invention to provide methods and apparatus for efficient and cost effective upgrading to existing infrastructure copper wire communication pairs.

These and other objects can be achieved by the present invention which provides bidirectional telephone delivery circuitry and methods for supporting a multiplicity of telephone subscriber lines at a downstream distribution terminal using only two of a multiplicity of pre-existing transmission line pairs connected between an upstream distribution terminal and the downstream distribution terminal. The methods and apparatus comprise an upstream distribution terminal which may receive and transmit PCM telephone signals to and from one location. These PCM signals are routed to conversion circuitry which includes an HDSL driver and receiving circuit for receiving HDSL TDM signals from a downstream terminal and for transmitting corresponding HDSL TDM signals to the downstream terminal. A pair of HDSL isolation transformers are included and, according to one embodiment, each of the pair has an upstream side coil connected to the HDSL driver and receiver circuit and each also has a downstream side coil connected to one of two conductor pairs such as a pair of copper tip and ring conductors typically used for existing voice telephone service. Each of the downstream coils of the two transformers also includes a center tap. There is included power circuitry for providing a source of regulated and current limited DC power which has a power output terminal connected to the center tap of one of the pair of isolation transformers, and a power return terminal connected to the center tap of the other one of the pair of isolation transformers. The two transmission line pairs will typically be selected from the existing multiplicity of infrastructure, two conductor telephone transmission line pairs used for tip and ring voice telephone service and located between the upstream distribution terminal and the downstream distribution terminal. As mentioned above, one of the transmission line pairs is connected to each side of the downstream coil of one of the isolation transformers and the other one of the transmission line pairs is connected to each side of the downstream coil of the other one of the transmission line pairs. The existing infrastructure at the downstream distribution terminal will typically include a multiplicity of telephone subscriber lines connected between a plurality of user locations such as homes or businesses and the downstream distribution terminal. Thus, the downstream distribution terminal is located between the two conductor transmission line pairs and the selected multiplicity of telephone subscriber lines. The downstream distribution terminal will also include a pair of isolation transformers and an HDSL TDM driver and receiver circuit substantially similar to that in the upstream distribution terminal which connects with the HDSL TDM driver and receiver circuit located in the upstream distribution terminal through the two transmission line pairs. The DC power distribution circuit provides a DC power source in the downstream distribution terminal and includes at least a pair of output terminals and an input power terminal connected to the center tap of one of the isolation transformers connected across one of the transmission line pairs and an input power return terminal connected to the center tap of the other isolation transformers connected across the other one of the transmission pairs so as to receive the source of regulated and current limited DC power from the upstream distribution terminal.

The power circuitry located in the upstream distribution terminal provides the regulated and current limited DC power to the downstream distribution terminal on the same two transmission line pairs which also carry HDSL TDM bidirectional telephone signals. The power circuitry comprises a pair of HDSL isolation transformers and the downstream coil of the isolation transformers each include the center taps one each connected to the power output terminal and the other to the power return terminal. The DC regulated power and current limited circuitry comprises an optical isolator, a voltage regulator circuitry, a transistor driver with a shutoff, an over-voltage shutdown, and a three-volt regulator.

BRIEF DESCRIPTION OF THE DRAWINGS

These and other features of the present invention will be more fully disclosed when taken in conjunction with the following Detailed Description of the Invention in which like numerals represent like elements and in which:

FIG. 3 is a block diagram of the system circuitry of the present invention located at an "upstream" distribution terminal;

FIG. 3A shows a pair of isolation transformers in the "downstream" distribution terminal used to receive DC regulated power at the center taps.

DETAILED DESCRIPTION OF THE INVENTION

Figure 1:
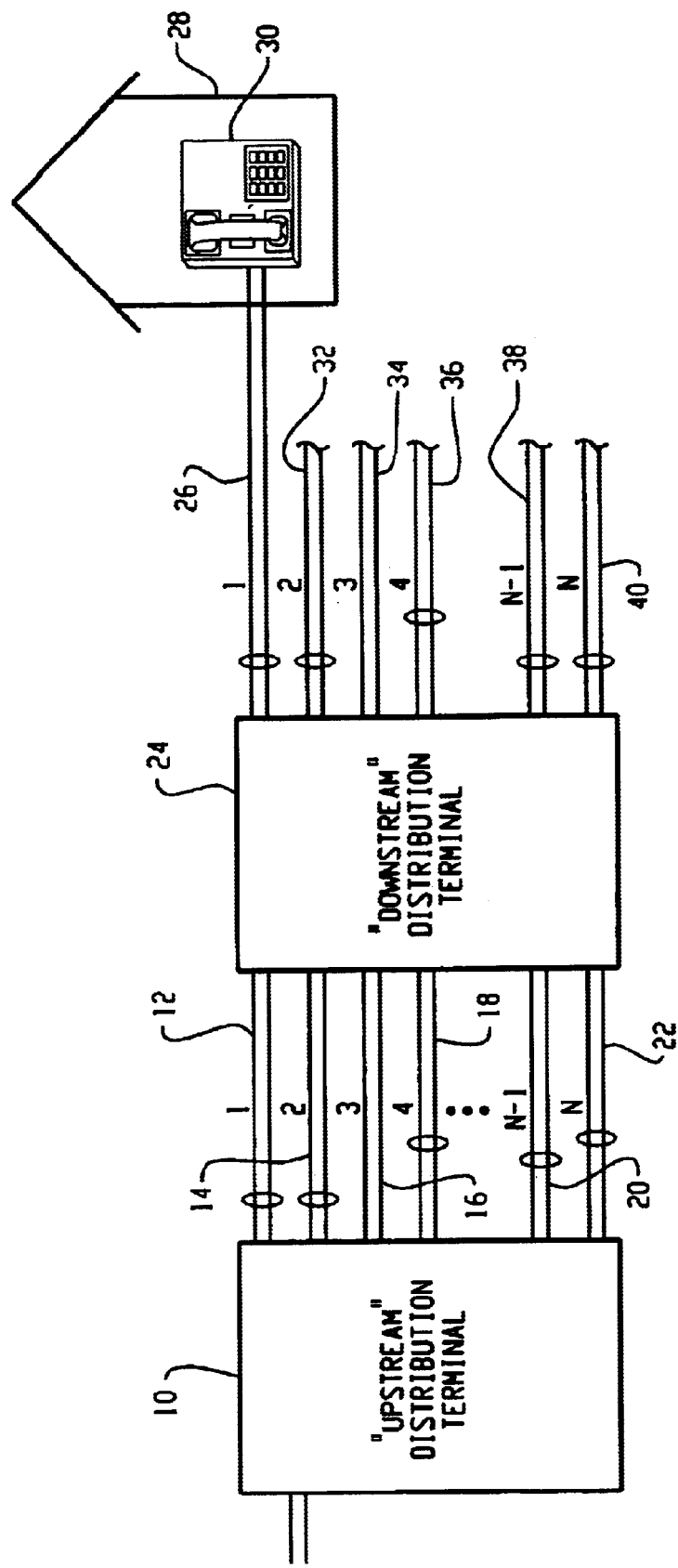
FIG. 1 is a prior art diagram of existing tip and ring telephone circuitry.

Referring now to FIG. 1, there is shown a portion of the distribution circuitry for a prior art telephone system using a pair of electrical conductors for each channel of communication. As shown in the figure, there is an "upstream" distribution terminal 10 providing a multiplicity "N" of conductor pairs 12, 14, 16, 18, 20 and 22 to a "downstream" distribution terminal 24. The multiplicity "N" of conductor pairs, according to the infrastructure of a typical telephone system, is equal to twenty-four. Downstream distribution terminal 24 provides a like number "N" of conductor pairs to end users or subscribers such as conductor pair 26 to a house 28 having a standard voice telephone connection 30. The term "upstream" is used herein to indicate a distribution terminal closest to a central office, and the term "downstream" is used to indicate a distribution terminal close to the end user. In this prior art system, it is seen that it was required to have at least as many conductor pairs between the "upstream" distribution terminal and the downstream distribution terminal as it was between the downstream distribution terminal 24 and each of the individual telephone services connected to the distribution terminal 24 as indicated by conductor pairs 26, 32, 34, 36, 38 and 40.

Figure 2:
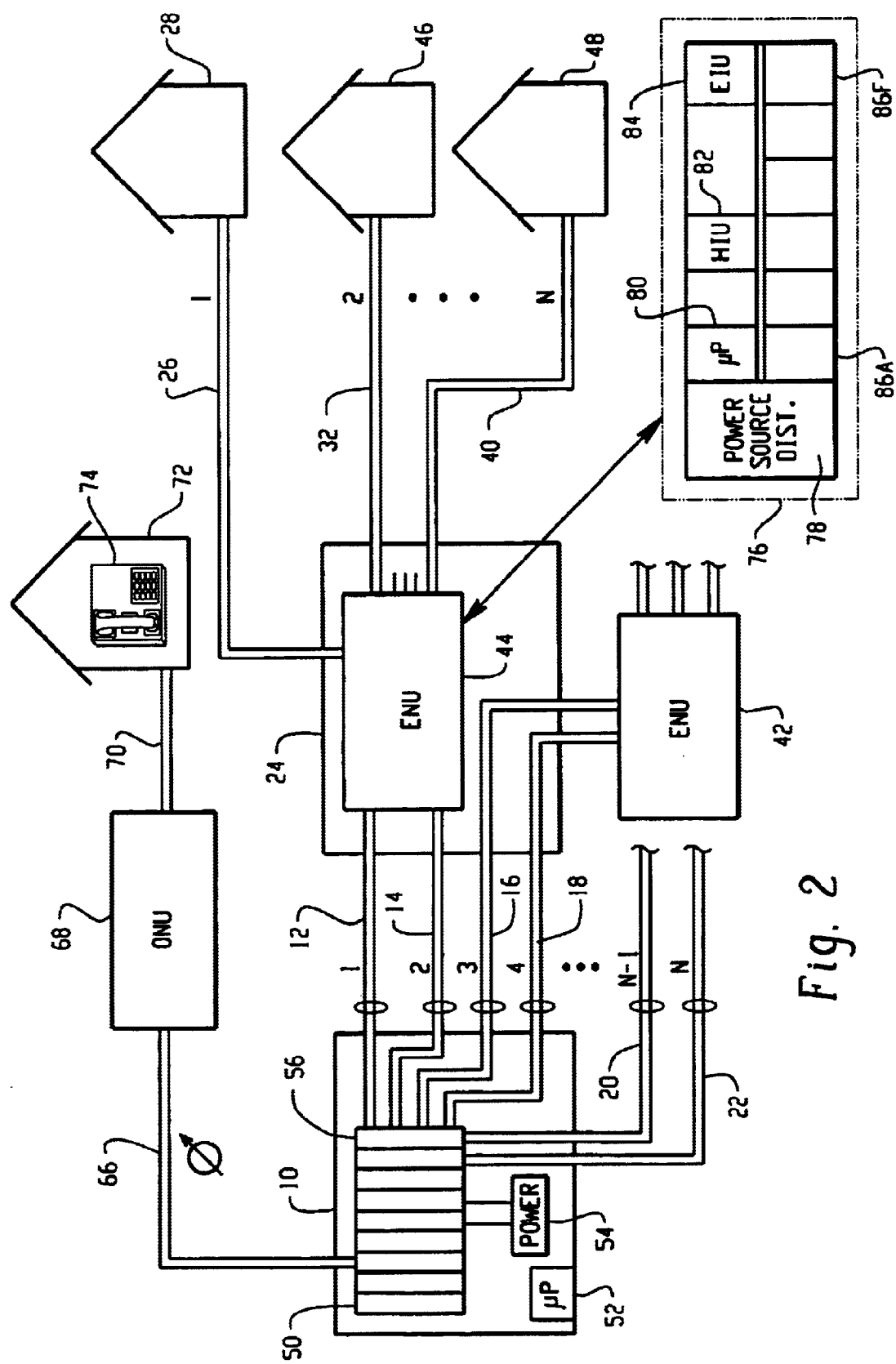
FIG. 2 shows a block diagram overview of the system circuitry of the present invention utilizing some of the infrastructure of the prior art.

Referring now to FIG. 2, there is shown a block diagram of the telephone service of the present invention which uses some of the infrastructure of the prior art system but in a much more efficient way that allows substantial increase in the number of communication channels. For example, the remote distribution terminal 10 may be the same outside steel cabinet as used with the prior art and which has the same number or multiplicity of conductive pairs represented by line pairs 12, 14, 16, 18, 20 and 22 which represent pairs 1 through N between the upstream distribution terminal 10 and the downstream distribution terminal 24. However, according to the present invention, it will only be necessary to use two conductive pairs such as pairs 12 and 14 to service the same number of customers connected to the local or downstream distribution terminal 24 as was serviced by distribution terminal 24 in the prior art circuitry of FIG. 1. Therefore, if for example there were twenty-four conductive pairs between the upstream distribution terminal 10 and the downstream distribution terminal 24 in the prior art, there will still be twenty-four conductive pairs between the two, but only two of the twenty-four pairs are necessary to provide all of the communication channels between remote or upstream distribution terminal 10 and local or downstream distribution terminal 24. Thus, the other twenty-two pairs can be used for other purposes as indicated by second downstream ENU (Electrical Network Unit) 42 which may be at a distance from downstream distribution terminal 24. In addition to being connected to line pairs 12 and 14 from remote or upstream distribution terminal 10, the ENU 44 in downstream distribution terminal 24 is also connected to the conductive pairs 26, 32, 34, 36, 38 and 40 to the end users such as end user 28 on line 26 and end users 46 and 48 on lines 32 and 40 respectively.

According to the present invention, remote or upstream distribution terminal 10 will now include new equipment such as the Matrix Distribution Shelf (MDS) 50, a microprocessor 52 and a power source 54. According to one embodiment, MDS 50 has sufficient slots to handle up to fourteen separate communication boards, such as communication board 56. Also, according to the present invention, each of the communication boards can handle four separate distribution circuits according to the teachings of the present invention of the type shown in FIG. 3. Each of the two circuits are connected to two transmission line pairs such as transmission line pairs 12 and 14. Thus, according to the present invention, the communications board 56 on the Matrix Distribution Shelf 50 can receive transmission line pairs 12 and 14 connected to ENU 44 and transmission line pairs 16 and 18 connected to the second ENU 42. As shown in FIG. 3, circuitry included on the communications board 56 includes a field programmable gate array 58, HDSL signal driver and receiver 60, Power Protection and Current Limiter Circuitry 62 and surge protection circuitry 64. In addition to the circuitry located on the communications board 56 as discussed above, the upstream distribution terminal also includes microprocessor 52 and power supply 54 which are also connected in a similar manner to the other thirteen communication boards.

Thus, as will become clear hereinafter, by using the new and unique circuitry of this invention and the HDSL transmission format, the two conductor pairs 12 and 14 are now capable of carrying all twenty-four of the communication channels that were carried by the multiplicity or twenty-four conductive pairs required by the prior art circuitry. It should be understood that references to twenty-four communication channels is for convenience only since that is the number in many existing prior art telephone systems. The number can, of course, vary from twenty-four. In addition, it is seen that another multiplicity of twenty-four prior art communication channels can also be routed through downstream distribution terminal 24 to be carried by conductive pairs 16 and 18. Furthermore, as is indicated by the optical transmission line 66, completely new and different transmission methods such as light transmission methods through optical fiber 66 can be provided from the remote or upstream distribution terminal 10 to a different downstream distribution terminal 68. As an example only, downstream distribution terminal 68 may be a completely optical system which receives at least one optical fiber 66 carrying a large multiplicity of communication channels from upstream terminal 10 to the ONU or downstream distribution terminal 68. ONU 68 may represent a local or downstream distribution terminal for new construction, office buildings, new residential subdivisions, etc. Thus, as shown in the drawing, there is also included at least one communication channel 70 between ONU 68 and subscriber location 72 with a telephone 74. It will be appreciated that the communication channel between ONU 68 and subscriber location 72 could be by means of an optical fiber or traditional communication pairs.

In addition to new equipment provided in the remote distribution cabinet 10, it will also be necessary to provide new equipment such as ENU 44 in the downstream distribution terminal or cabinet 24. As shown in the blown-up portion 76 of FIG. 2, ENU 44 will include power distribution circuitry 78, its own microprocessor 80, HIU (HDSL Interface Unit) 82 for receiving the HDSL formatted communication data and an EIU or Electrical Interface Unit 84 which interfaces the communication channels carried on the two communication pairs 12 and 14 between upstream terminal 10 and downstream terminal 24 with the individual communication or channel quad cards 86a through 86f. Each of the six channel cards 86a through 86f can handle up to four communication circuits and thus, the full original twenty-four circuits can receive the twenty-four different communication pairs from the original twenty-four customers. These twenty-four communication signals are then converted to a HDSL format so they can be handled by the two transmission pairs 12 and 14 connected between the upstream terminal 10 and the local or downstream terminal 24 rather than the twenty-four line pairs required by the prior art.

As will be appreciated by those skilled in the art, the addition of electronic equipment such as located in ENU 44 at terminal 24 and which allows a significant increase in communication channels without any increase in transmission wire pairs to the cabling infrastructure requires a stable and dependable power source. Therefore, unless each downstream terminal, such as terminal 24, is connected to a power source and includes its own regulated power supply circuitry for operating the electronic equipment, it is necessary that the stable and dependable power source be provided from the upstream terminal 10 which may be located at a significant distance from downstream terminal 24. According to the present invention, a regulated and current limiter power source is provided from the upstream distribution terminal 10 to a power distribution panel 78, which in turn is connected to microprocessor 80, HIU 82 and the six channel cards 86a through 86f. As was discussed above, regulated power is connected to the center taps 88 and 92 of the two isolation transformers 90 and 94 which transformers are connected across the two transmission line pairs 12 and 14. As shown in FIG. 3A, two isolation transformers 90A and 94A are connected across the same two transmission line pairs which extend between the "upstream" distribution terminal 10 and the "downstream" distribution terminal 24. Thus, the regulated power provided from the "upstream" terminal is accessed at the "downstream" terminal 24 by center taps 88A and 92A. This regulated power is connected to power distribution panel where it is available to the circuitry in "downstream" distribution terminal 24 as discussed above.

Figure 4:
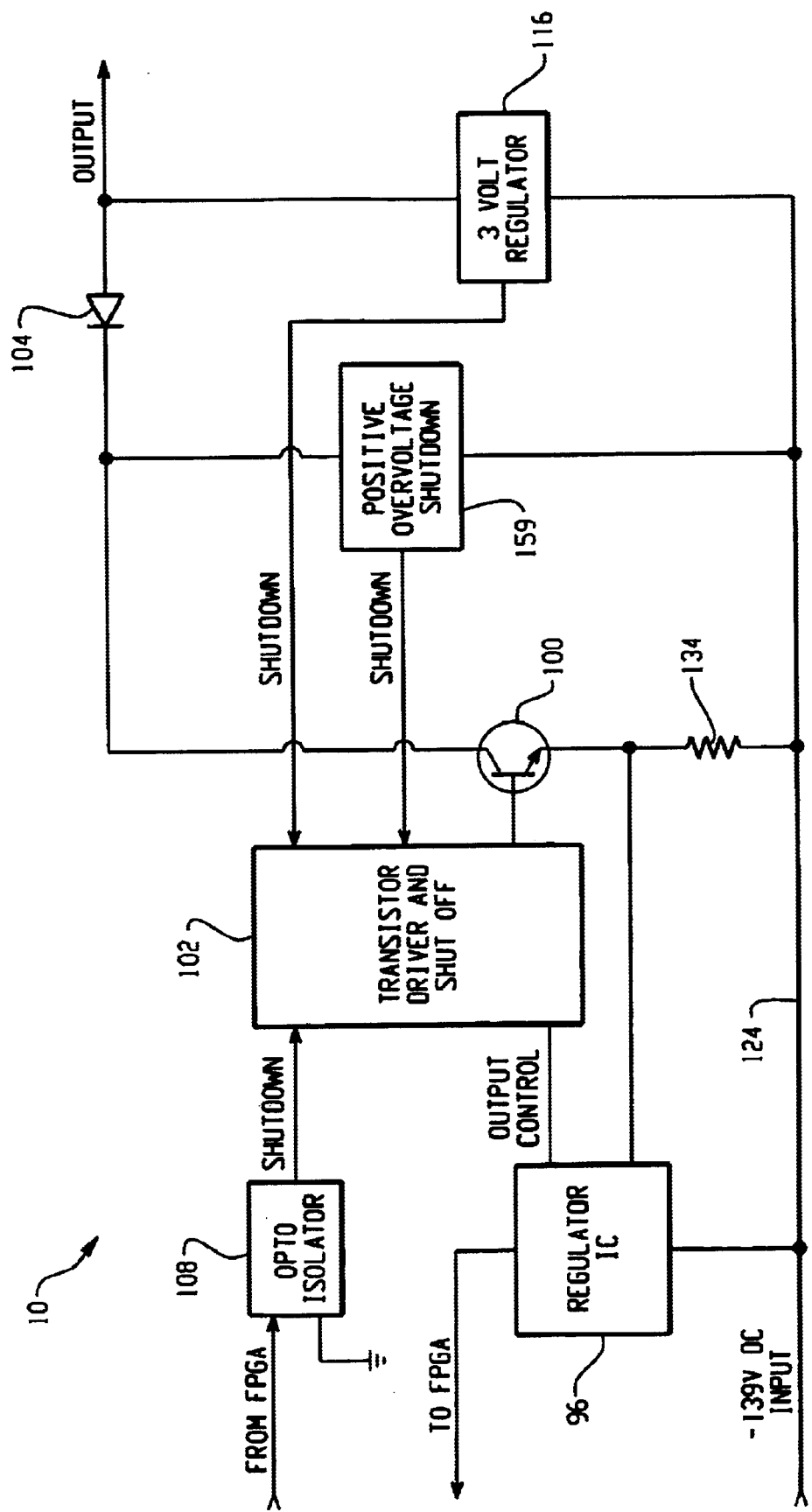
FIG. 4 is a block diagram of the power regulation and current limiting circuitry of the system circuitry shown in FIG. 3.
Figure 5A:
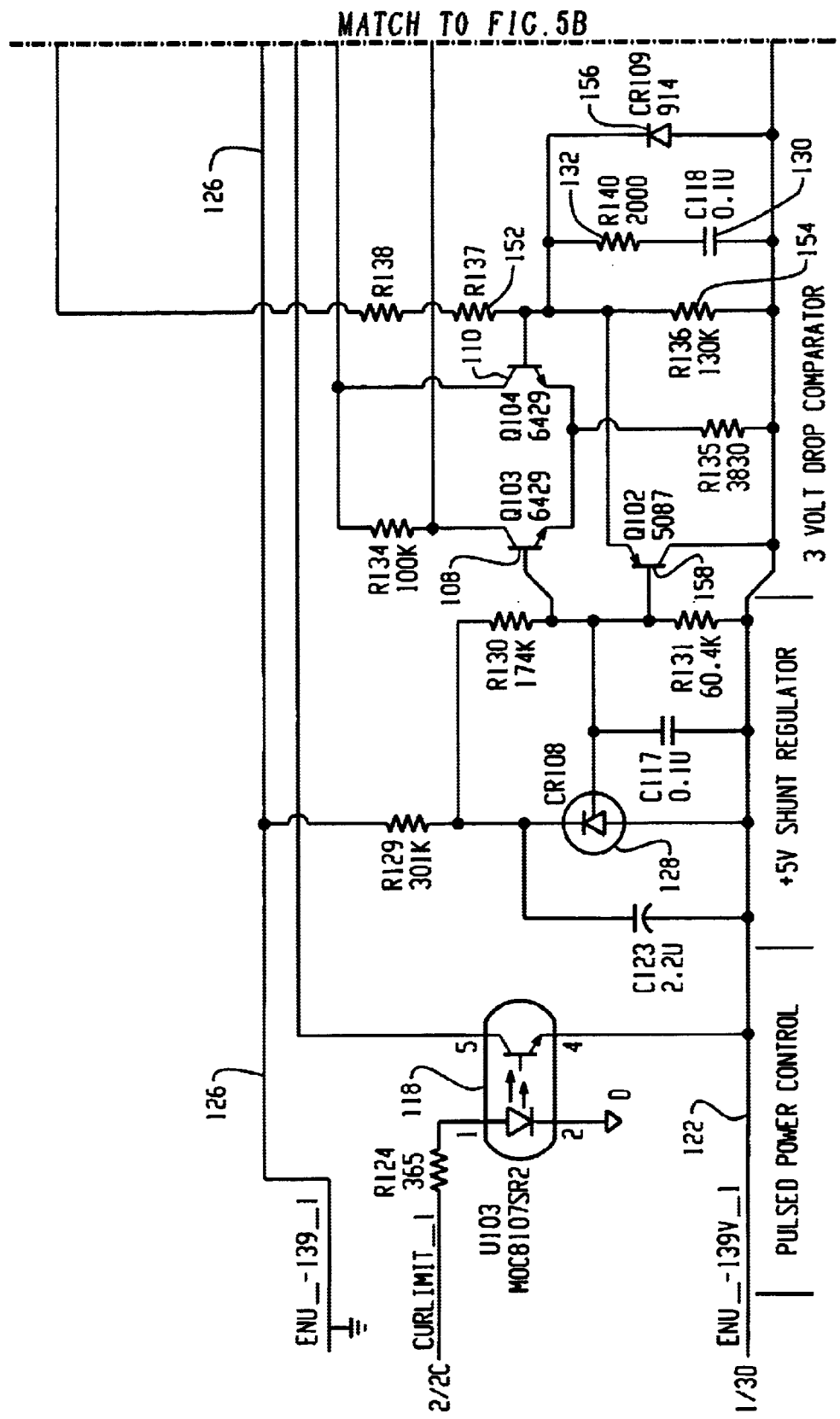
FIGS. 5A and 5B are an electrical schematic of the power regulation and current limiting circuitry of the present invention.
Figure 5B:
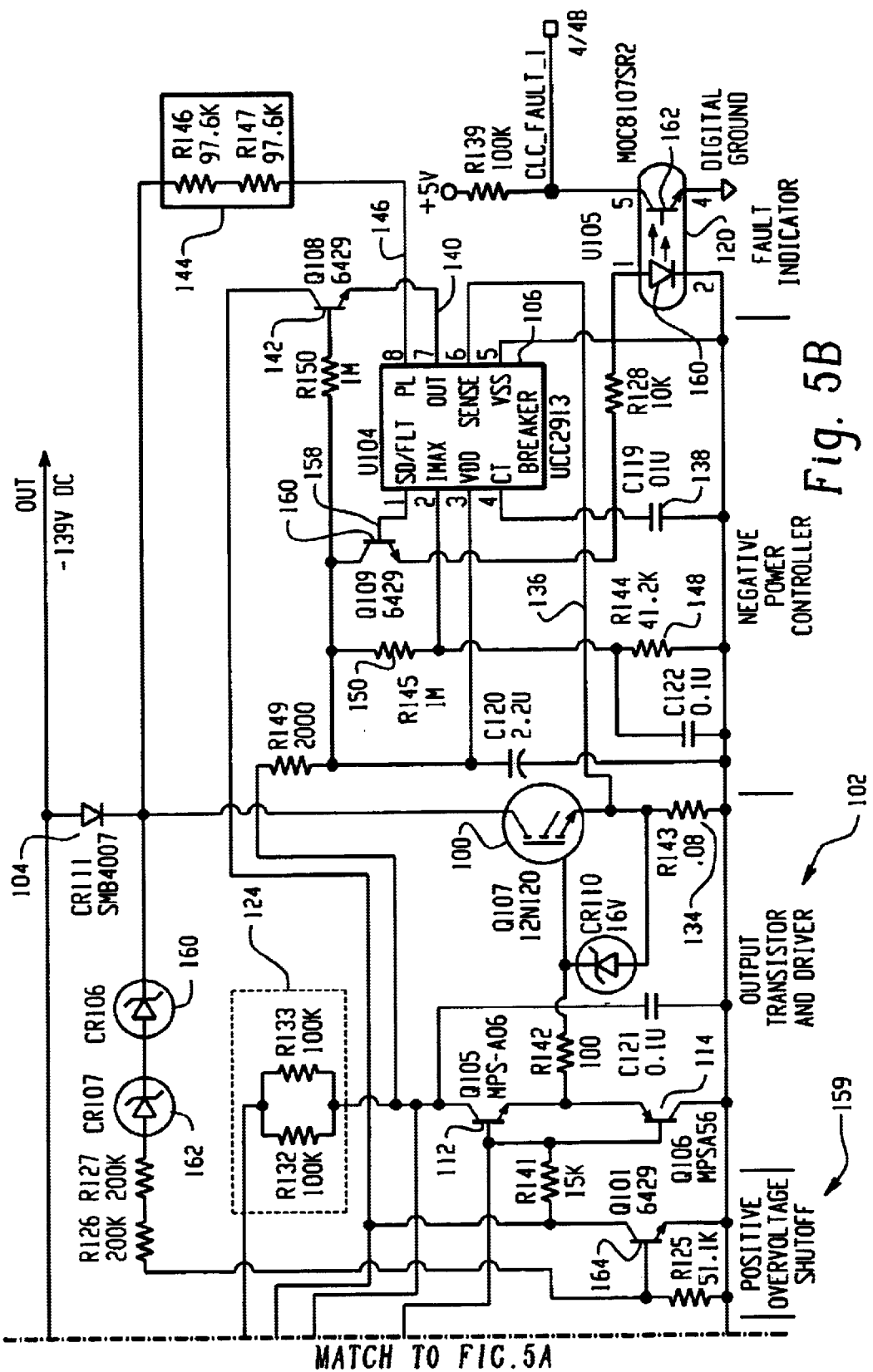

Referring now to FIG. 4, there is shown a block diagram of the Power Protection and Current Limiter Circuitry 62 included in upstream terminal 10. Circuitry 62 provides a stable and dependable source of power to one or more downstream distribution terminals located at distances up to 12,000 feet, such as, for example, downstream or local distribution terminal 24. FIG. 5 is a detailed circuit diagram of the block diagram of FIG. 4.

As shown in FIG. 3, Power Protection and Current Limiter Circuitry 62 provides up to 100 VA from power supply 54 at a −139 volts between the center tap 88 of isolation transformer 90 and the center tap 92 of isolation transformer 94 connected to the return of power supply 54. Thus, the voltage output of the −139 volt power is carried to downstream distribution terminal 24 by both conductors 95 and 96 of transmission line pair 14 connected to isolation transformer 90 as discussed above. Similarly, the return for the −139 volts is carried between upstream terminal 10 and downstream terminal 24 by both conductors 98 and 100 of transmission line pair 12 by isolation transformer 94. As will be appreciated by those skilled in the art, the voltage level provided to distribution downstream terminal 24 could be selected to be different than the −139 volts discussed above. However, present day safety standards limit the voltage differential from ground to no more than 140 volts. Therefore, a tap differential value of 139 volts is selected to assure the safety standards are not exceeded, while at the same time providing the maximum possible voltage level. It should also be understood that the actual HDSL TDM communication signals are also carried by these same two transmission pairs 12 and 14.

Referring now to FIGS. 4 and 5, the operation of Power Protection and Current Limiter Circuitry 62 will be discussed. Circuitry 62 provides the 100 VA limit function by limiting the current in the negative lead when it exceeds the predetermined internal fault value. Also, as should be appreciated by those skilled in the art, the limit function of 100 VA is referenced only because that is a convenient and often used value. The invention is not considered to be limited to this value and the actual power limits may vary significantly from that value. As will be discussed, the limiting is provided by a combination of peak current limiting and pulsed on-line control. In normal operation, the unit also provides a controlled voltage drop of about three volts in order to maintain a regulated or constant voltage to the power loop. The Power Protection and Current Limiter Circuitry 62 also will produce a momentary power interruption if the HDSL link is dropped. This allows a line protector to reset which may have activated due to an outside event such as, for example, lightning. The unit will also survive the surges and power fault voltages which manage to make it through a primary protector.

More specifically, the Power Protection and Current Limiter Circuitry 62 consists of several functional sections. Transistor 100, or another similar control element, along with its transistor driver circuitry and shutoff circuitry 102, provides the necessary current regulation and is the control element for regulation of the three-volt voltage drop. Diode 104 isolates the current limiter circuitry from any negative surges, and Regulator or Integrated Circuit 146 provides the current limit function including sensing and pulsing. Transistors 108, 110, 112 and 114 as part of the three-volt Regulator circuitry 116 comprise a discrete amplifier used to regulate the voltage drop. Optical isolating circuitry 118 provides an overriding shutdown function from the control FPGA (field programmable gate array) in response to a fault indicator signal from an optical isolator transistor 120. The Power Protection and Current Limiter Circuitry 62 is powered by the negative voltage provided by the −139 volt supply on line 122 through bias resistor circuit 124 to the 139 volt return on line 126.

In normal operation, integrated circuit 106 contains an internal 9.5V zener diode which provides voltage regulation for Integrated circuit 106 and the transistor driver amplifier 102. During normal operation, the load current is less than the trip point and the voltage drop across the Limiter Circuitry 62 is controlled to about 3 volts. The three-volt Voltage Regulator 116, which is comprised of transistors 108, 110, 112 and 114, compares a reference voltage generated on the base of transistor 108 with a fraction of the voltage drop appearing on the base of transistor 110. It then provides gate drive to Control transistor 100. Control transistor 100 holds the voltage drop at a nominal 3 volts from the input to the output of Limiter Circuit 62. Diode 128 provides 1.24 volts to the base of transistor 108. Capacitor 130 and resistor 132 provide compensation to keep the Power Protection and Current Limiter Circuitry 62 regulator loop stable. In the event of a fault or an out of tolerance condition of the circuit discussed above, which fires or activates optical isolator transistor 120, optical isolation circuitry 118 will turn the current limiter off for a pre-selected time period such as about 90–92 seconds, and thereby provides release for a potentially latched ENU protector.

The rather lengthy predetermined time period that the optical isolation circuitry 118 is maintained in an "off" condition also prevents the generation of excessive noise or cross talk to other transmission line pairs which could occur as the Integrated Circuit 106 repeatedly attempts to reset at a very rapid rate when the fault condition still exists.

The load current provided to downstream distribution terminal 24 will be interrupted if found to be excessive. More specifically, the load current passes through resistor 134 which develops a voltage on line 136 for current sensing. Integrated circuit 106 is set to have a nominal threshold such as, for example, 50 m volts. When the voltage on line 136 reaches 50 m volts, capacitor 138 begins to charge to a selected value such as, for example, 2.5 volts. Thus, when the voltage on capacitor 138 reaches 2.5 volts, the output on line 140 of integrated circuit 106 will turn off transistor 142 which in turn will turn off control transistor 100. As will be discussed below, integrated circuit 106 will attempt to turn control transistor 100 back on after a selected time period has expired. While in the trip or off condition, integrated circuitry 106 operates control transistor 100 in a pulse width modulated mode so as to manage the power dissipation in Power Protection and Current Limiter Circuit 62. The output of integrated circuitry 106 is buffered by transistor 142 to allow for supply voltage differences between integrated circuit 106 and the gate drive of control transistor 100. Resistor circuit 144 provides load voltage information on line 146 to integrated circuit 106 so that the power dissipation in control transistor 100 can be controlled.

If the load is suddenly increased such that the current far exceeds the 100 VA limit (for example, there is a short on the line), integrated circuit 106 provides a current regulation mode that is set to about 5 amps. A divider circuit provided by resistors 148 and 150 are selected to determine this threshold. Thus, in the case of a short in the line between upstream distribution terminal 10 and the downstream distribution terminal 24, the pulse modulation will begin and limit the power dissipated in the Power Protection and Current Limiter Circuitry 62. The Power Protection and Current Limiter Circuitry 62 according to one embodiment, is designed to survive surges which may pass through a primary protector. A resistor divider formed by resistors 152 and 154 are arranged to safely handle the anticipated surge voltage using surface mount resistors. During a negative surge, diode 104 blocks the voltage to most of the circuitry. The resistor divider formed by resistors 152 and 154 connected to the base of transistor 110 is prevented from over-driving transistor 110 by clamping diode 156. Clamping diode 156 limits the voltage swing on the base of transistor 110 to the voltage across one diode.

During a positive surge, the same resistor divider formed by resistors 152 and 154 limits over-driving of transistor 110 by the clamping action of the emitter of transistor 158. It is important to limit the overdrive of transistor 110 to allow for a quick recovery after a surge. If the surge voltage reaches a pre-selected value such as, for example, in excess of 40 volts, over-voltage shutdown circuitry 159, which circuitry includes the zener diode pair 160 and 162, conducts and turns on transistor 164. Transistor 164 lowers the gate drive voltage of control transistor 100 thereby preventing a high voltage/high current situation for control transistor 100. As control transistor 100 turns off, its collector voltage quickly rises. Control transistor 100 is selected to survive a voltage surge of 1,000 volts.

Whereas, the Power Protection and Current Limiter Circuitry 62 controls and limits the power and current provided to downstream distribution terminal 24, this status is monitored by FPGA control circuitry 58 by means of output 158 from integrated circuitry 106 to determine if and when a fault condition exists. The fault indication on line 158 turns on transistor 150 which in turn switches on the Light Emitting Diode (LED) 160 in optic isolator 120. The light from LED 160 turns on the light sensitive transistor 162 also in optic isolator 120. The output of transistor 162 is provided to FPGA control circuitry 58. As discussed above, if FPGA control circuitry 58 detects a fault condition, it will shut off the power for a pre-selected time period by activating the optical isolator 118 which in turn will turn off control transistor 100. The FPGA control will try to reapply power after a pre-selected time period such as, for example according to one embodiment, 92 seconds. If the limiter is still indicating an over-current condition, the power will be shut off again and then attempt to reapply after another 92 seconds.

The corresponding structures, materials, acts and equivalents of all means or step plus function elements in the claims below are intended to include any structure, material or act for performing the function in combination with other claimed elements as specifically claimed.

What is claimed is:

1. Circuitry for providing regulated and current limited DC power from an upstream distribution terminal to a downstream distribution terminal on two transmission line pairs also carrying HDSL TDM bidirectional telephone signals, said circuitry comprising:

a pair of HDSL isolation transformers each comprising an upstream coil and a downstream coil, said downstream coils of each of said isolation transformers including a center tap;

two transmission line pairs for carrying HDSL TDM signals connected one each between said downstream coils of said upstream distribution terminal and said downstream distribution terminal;

DC power circuitry located in said upstream distribution terminal for providing a source of regulated and current limited power to said downstream terminal and having a power output terminal and a return terminal, said power output terminal connected to said center tap of said downstream coil of one of said pairs of isolation transformers and said power return terminal connected to said center tap of said downstream coil of the other one of said pair of isolation transformers; and DC power distribution circuitry for providing DC power in said downstream distribution circuitry including power output terminals and an input power source terminal connected to one of said transmission line pairs and an input power return terminal connected to the other one of said transmission line pairs so as to receive said source of regulated and current limited DC power from said upstream distribution terminal.

2. The circuitry of claim 1 wherein said source of DC power circuitry located in said upstream distribution terminal includes a transistor drive circuit for adjusting and limiting the current load provided to said downstream distribution terminal.

3. The circuitry of claim 2 and further including surge protection circuitry in said source DC power circuitry for protecting against both positive and negative voltage surges.

4. The circuitry of claim 3 wherein said surge protection circuitry can protect against up to a 1000V positive voltage surge.

5. The circuitry of claim 2 and further including short protection circuitry in said source DC power circuitry to remove power provided to said downstream distribution terminal in the event of a load current in excess of a predetermined value, said short protection circuitry including reset circuitry to reestablish power provided to said downstream distribution terminal if said excess current load is removed.

6. The circuitry of claim 2 and further including monitoring circuitry to determine the presence of a fault in said source DC power circuitry, said monitoring circuitry providing a signal to said source DC power circuitry such that said power provided downstream is interrupted, said monitoring circuitry further providing a signal to reestablish said power after a predetermined time period.

7. The circuitry of claim 1 and further comprising a pair of isolation transformers in said downstream distribution circuitry, each of said pair of transformers having a center tap and each of said pair connected one each across one each of said transmission pairs and wherein said DC power distribution circuitry input power source terminal is connected to a center tap of one of said downstream isolation transformers and said input power return terminal is connected to the center tap of the other downstream isolation transformer.

8. Bidirectional telephone delivery circuitry for supporting a multiplicity of telephone subscriber lines at a downstream distribution terminal using only two of a multiplicity of pre-existing transmission line pairs connected between an upstream distribution terminal and said downstream distribution terminal, comprising:

an upstream distribution terminal having:
  an HDSL driver and receiver circuitry at said upstream terminal for receiving HDSL TDM signals from said downstream terminal and transmitting corresponding HDSL TDM signals to said downstream distribution terminal;
  a pair of HDSL isolation transformers, each of said pair having an upstream coil connected to said HDSL driver and receiver circuitry, and each having a downstream coil connected one each to said two conductor pairs, each of said downstream coils also including a center tap;
  power circuitry for providing a source of regulated and current limited DC power to said downstream terminal and having a power output terminal and a return terminal, said power output terminal connected to said center tap of said downstream coil of one of said pair of isolation transformers and said power return terminal connected to said center tap of said downstream coil of the other one of said pair of isolation transformers;
  two transmission line pairs extending between said upstream distribution terminal and said downstream distribution terminal, one of said transmission line pairs connected across said downstream coil of one of said isolation transformers and the other one of said transmission line pairs connected across said downstream coil of the other one of said transmission line pairs;
a selected multiplicity of telephone subscriber lines connected between a multiplicity of user locations and said downstream distribution terminal;
said downstream distribution terminal located between said two conductor transmission line pairs and said selected multiplicity of telephone subscriber lines, said downstream distribution terminal including HDSL TDM driver and receiver circuitry which connects with said HDSL TDM driver and receiver circuitry located in said upstream distribution terminal through said two conductor transmission line pairs; and
DC power distribution circuitry for providing a DC power source in said downstream distribution terminal, said DC power distribution circuitry including output terminals and an input power source terminal connected to one of said transmission line pairs and an input power return terminal connected to the other one of said transmission line pairs so as to receive said source of regulated and current limited DC power from said upstream distribution terminal.

9. The circuitry of claim 8 wherein said source of DC power circuitry located in said upstream distribution terminal includes a transistor drive circuit for adjusting and limiting the current load provided to said downstream distribution terminal.

10. The circuitry of claim 8 and further including surge protection circuitry in said source DC power circuitry for protecting against both positive and negative voltage surges.

11. The circuitry of claim 8 wherein said surge protection circuitry can protect against up to a 1000V positive voltage surge.

12. The circuitry of claim 8 and further including short protection circuitry in said source DC power circuitry to remove power provided to said downstream distribution terminal in the event of a load current in excess of a predetermined value, said short protection circuitry including reset circuitry to reestablish power provided to said downstream distribution terminal if said excess current load is removed.

13. The circuitry of claim 8 and further including monitoring circuitry to determine the presence of a fault in said source DC power circuitry, said monitoring circuitry providing a signal to said source DC power circuitry such that said power provided downstream is interrupted, said monitoring circuitry providing a signal to reestablish said power after a possible time period.

14. The circuitry of claim 8 and further comprising a pair of isolation transformers in said downstream distribution circuitry, each of said pair of transformers having a center tap and each of said pair connected one each across one each of said transmission pairs and wherein said DC power distribution circuitry input power source terminal is connected to a center tap of one of said downstream isolation transformers and said input power return terminal is connected to the center tap of the other downstream isolation transformer.

15. A method for providing regulated and current limited DC power from an upstream distribution terminal on two transmission line pairs also carrying HDSL TDM bidirectional telephone signals, said method comprising the steps of:

providing two transmission line pairs for carrying HDSL TDM signals between an upstream distribution terminal and a downstream distribution terminal;

connecting the downstream coils of a pair of HDSL isolation transformers having center taps one each across one each of said two transmission line pairs;

providing DC power circuitry for generating a source of regulated and current limited power for transmission to said downstream distribution circuitry, said DC power circuitry including a power output terminal and a return terminal;

connecting said power output terminal and said return terminal one each to a center tap of said downstream coils of said pair of isolation transformers connecting inputs of DC power distribution circuitry located in said downstream distribution terminal to said two transmission line pairs; and transmitting regulated DC power through said two transmission line pairs from said upstream terminal to said downstream terminal.

* * * * *